US012687963B2

(12) United States Patent
Wang et al.

(10) Patent No.: US 12,687,963 B2
(45) Date of Patent: Jul. 21, 2026

(54) EFFICIENT UNMAP HANDLING USING SYNCHRONIZED REDUNDANT COMPONENTS OF DATA OBJECTS

(71) Applicant: VMware LLC, Palo Alto, CA (US)

(72) Inventors: Wenguang Wang, Santa Clara, CA (US); Eric Knauft, San Francisco, CA (US); Sudheer Thokala, Dublin, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/922,244

(22) Filed: Oct. 21, 2024

(65) Prior Publication Data

US 2025/0117133 A1     Apr. 10, 2025

Related U.S. Application Data

(63) Continuation of application No. 18/159,656, filed on Jan. 25, 2023, now Pat. No. 12,124,701.

(51) Int. Cl.
G06F 3/06 (2006.01)
(52) U.S. Cl.
CPC ............ G06F 3/061 (2013.01); G06F 3/0652 (2013.01); G06F 3/0679 (2013.01)
(58) Field of Classification Search
CPC ....... G06F 3/061; G06F 3/0652; G06F 3/0679
See application file for complete search history.

(56) References Cited

U.S. PATENT DOCUMENTS

| | | | |
|---|---|---|---|
| 11,599,554 B2 | 3/2023 | Xiang et al. | |
| 2006/0200639 A1* | 9/2006 | Levy ................... | G06F 11/1458 711/162 |
| 2013/0138607 A1 | 5/2013 | Bashyam et al. | |
| 2014/0195748 A1* | 7/2014 | Bashyam .............. | G06F 3/0652 711/159 |
| 2018/0032257 A1 | 2/2018 | Xiang et al. | |
| 2018/0278685 A1* | 9/2018 | Tiwari ................ | H04L 67/1095 |
| 2018/0349233 A1 | 12/2018 | Zaydman et al. | |

(Continued)

OTHER PUBLICATIONS

Airfocus, API, Oct. 3, 2022, available at: https://web.archive.org/web/20221003044428/https://airfocus.com/glossary/what-is-an-api/ (Year: 2022).*

(Continued)

*Primary Examiner* — Ryan Bertram
(74) *Attorney, Agent, or Firm* — King Intellectual Asset Management

(57) ABSTRACT

Components of a distributed data object are synchronized using streamlined tracking metadata. A target component of the distributed data object is detected as it becomes available and stale. A source component that is up-to-date and that mirrors the address space of the detected target component is identified. A set of mapped address ranges and a set of unmapped address ranges of the identified source component are obtained. A mapped address range of the target component that corresponds with an unmapped address range of the source component is identified. The identified mapped address range of the target component is then synchronized with the corresponding unmapped address range of the source component. Thus, unmapped address ranges are synchronized without using tracking metadata of the source component.

20 Claims, 7 Drawing Sheets

300

(56)          References Cited

U.S. PATENT DOCUMENTS

| | | | |
|---|---|---|---|
| 2019/0034505 A1 | 1/2019 | Renauld et al. | |
| 2021/0271691 A1 | 9/2021 | Patil et al. | |
| 2021/0374155 A1* | 12/2021 | Xiang | G06F 11/2094 |
| 2022/0171739 A1 | 6/2022 | Xiang et al. | |
| 2022/0342542 A1* | 10/2022 | Alkalay | G06F 12/0238 |
| 2023/0018790 A1* | 1/2023 | Xu | G06F 11/1471 |
| 2024/0111755 A1 | 4/2024 | Xu et al. | |
| 2024/0248605 A1 | 7/2024 | Wang et al. | |

OTHER PUBLICATIONS

U.S. Appl. No. 18/159,656, Non-Provisional Application filed on Jan. 25, 2023, 30 pages.
U.S. Appl. No. 18/159,656, Notice of Allowance dated Jun. 20, 2024, 21 pages.
U.S. Appl. No. 18/159,656, filed Oct. 22, 2024, Wang et al.

* cited by examiner

300

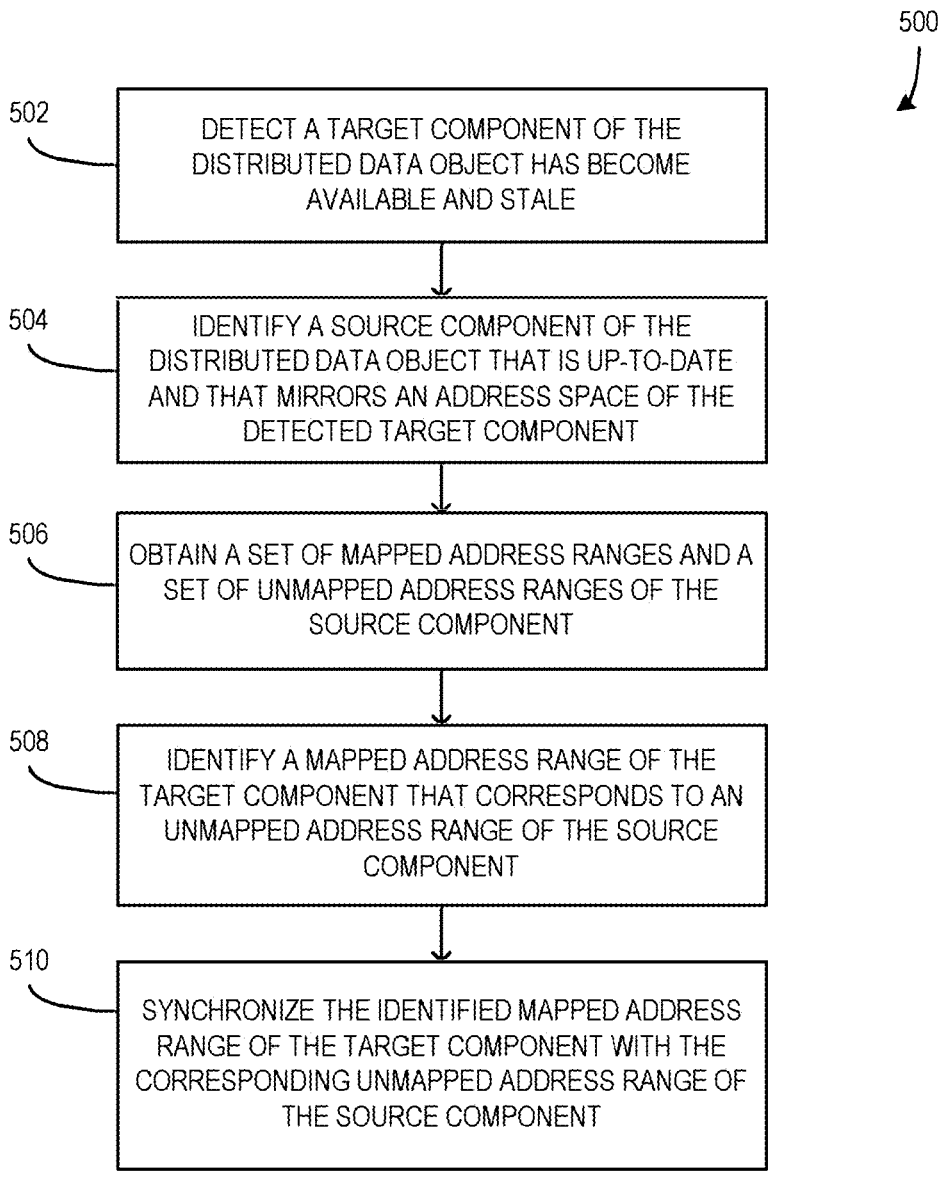

502 — DETECT A TARGET COMPONENT OF THE DISTRIBUTED DATA OBJECT HAS BECOME AVAILABLE AND STALE

504 — IDENTIFY A SOURCE COMPONENT OF THE DISTRIBUTED DATA OBJECT THAT IS UP-TO-DATE AND THAT MIRRORS AN ADDRESS SPACE OF THE DETECTED TARGET COMPONENT

506 — OBTAIN A SET OF MAPPED ADDRESS RANGES AND A SET OF UNMAPPED ADDRESS RANGES OF THE SOURCE COMPONENT

508 — IDENTIFY A MAPPED ADDRESS RANGE OF THE TARGET COMPONENT THAT CORRESPONDS TO AN UNMAPPED ADDRESS RANGE OF THE SOURCE COMPONENT

510 — SYNCHRONIZE THE IDENTIFIED MAPPED ADDRESS RANGE OF THE TARGET COMPONENT WITH THE CORRESPONDING UNMAPPED ADDRESS RANGE OF THE SOURCE COMPONENT

EFFICIENT UNMAP HANDLING USING SYNCHRONIZED REDUNDANT COMPONENTS OF DATA OBJECTS

CROSS-REFERENCES

This application is a continuation of U.S. patent application Ser. No. 18/159,656 filed Jan. 25, 2023, entitled "EFFICIENT UNMAP HANDLING USING SYNCHRONIZED REDUNDANT COMPONENTS OF DATA OBJECTS", the entirety of which is incorporated herein by reference.

BACKGROUND

Distributed data objects are often configured to store data redundantly across multiple components that mirror each other or otherwise store the same data. In this way, the data is protected against the failure of one or more of the components, as any components that remain available and/or active still store the data. To maintain such redundant components, a synchronization process is used to bring out-of-sync, or stale, components into sync with other up-to-date redundant components. Some synchronization processes track changes that occur to components with metadata, but in some cases, the tracking and storage of all changes requires significant use of storage and/or computation resources of the associated systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for synchronizing components of a distributed data object using streamlined tracking metadata is described. A target component of the distributed data object is detected as it becomes available and stale. A source component is identified that is up-to-date and that redundantly shares address space with the address space of the detected target component. A set of mapped address ranges and a set of unmapped address ranges of the identified source component are obtained. A mapped address range of the target component that corresponds with an unmapped address range of the source component is identified. The identified mapped address range of the target component is then synchronized with the corresponding unmapped address range of the source component.

BRIEF DESCRIPTION OF THE DRAWINGS

The present description will be better understood from the following detailed description read in light of the accompanying drawings, wherein:

FIG. 5 is a flowchart illustrating a method for synchronizing a stale target component with a source component of a distributed data object;

Figure 1:
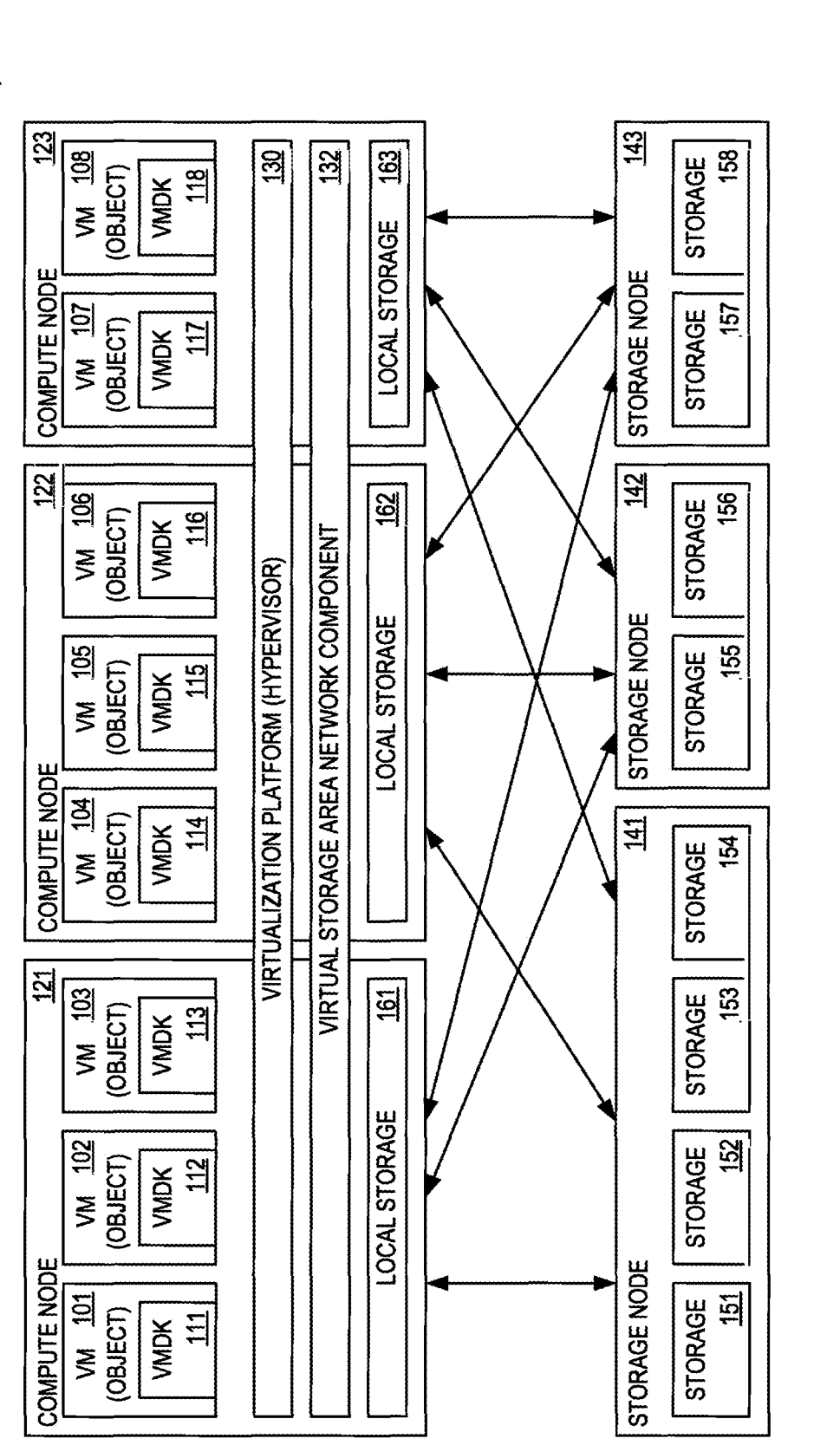
FIG. 1 is a block diagram illustrating a system architecture that is comprised of a set of compute nodes interconnected with each other and a set of storage nodes according to an embodiment.

Any of the figures may be combined into a single example or embodiment.

DETAILED DESCRIPTION

A computerized method and system synchronizes stale components with up-to-date components of distributed data objects using streamlined change tracking. A stale target component is detected, and a source component is identified that is up-to-date and that redundantly shares address space with the stale target component. The identified source component will be used to synchronize with the stale target component and bring it up to date. A set of mapped address ranges and a set of unmapped address ranges of the source component are obtained. The components are then synchronized by identifying a mapped address range of the target component that corresponds with an unmapped address range of the source component and synchronizing the identified mapped address range with the corresponding unmapped address range, such that the identified mapped address range becomes unmapped.

When one or more components of an object become unavailable, those components miss new write and unmap operations. Later when these components become available, the resync framework in system ensures these components are in a consistent state by reissuing missed writes and unmaps to the stale components. In some examples, for resynchronization to work correctly, an object manager process needs assistance from the lower layer (e.g., a log-structured object manager (LSOM)) to track all the write operations and unmap operations during a certain time. Instead of the lower layer manager tracking all unmap operations in the same way as writes by recording the log sequence number (LSN) of each unmap as tracking metadata, which incurs a significant memory cost in the lower layer manager as it substantially increases the required metadata space, the examples described herein do not require an object manager to track unmaps. In this way, the range of data that is being unmapped can be just deleted, at least because unmaps are always full stripe at the erasure coding level which means the unmaps are received by all the active mirrored or sibling components.

Some examples include changes to Application Program Interface (API) semantics of an object manager process to configure that process to treat unmapped address ranges and holes (e.g., address ranges that have never been written) the same. Such APIs always return all the unmapped address ranges in the component's address space. During a resynchronization process as described herein, the object manager is configured to issue unmaps to the target component only if there is an unmapped address range in the source component and no corresponding unmapped address range in the target. If both source and target have unmapped address ranges, there is no need to perform unmap operations.

The examples described herein operate in an unconventional manner at least by synchronizing unmapped address ranges of redundant components (e.g., multiple components that are configured to store separate copies of some or all of the same data, such as mirror components or sibling components) of a distributed data object without using tracking metadata to track associated unmapped I/O operations that are performed while the stale component was unavailable. The examples are configured in such a way that unmap operations are always performed in full stripe at the erasure coding level, such that those unmap operations are received by all active redundant components. This enables unmapped address ranges that have never been written to be treated the same as unmapped address ranges that have been written and then unmapped. Because these are treated the same, computational efficiency and the efficiency of use of data storage resources during change tracking within the distributed data object are improved.

FIG. 1 is a block diagram illustrating a system architecture 100 that is comprised of a set of compute nodes 121-123 interconnected with each other and a set of storage nodes 141-143 according to an embodiment. In other examples, a different number of compute nodes and storage nodes are used without departing from the description. Each compute node hosts multiple objects, which are virtual machines (VMs), containers, applications, and/or any compute entity that can consume storage, in some examples. When objects are created, they are designated as global or local, and the designation is stored in an attribute. For example, compute node 121 hosts objects 101, 102, and 103; compute node 122 hosts objects 104, 105, and 106; and compute node 123 hosts objects 107 and 108. Some of objects 101-108 are local objects. In some examples, a single compute node hosts 50, 100, or a different number of objects. Each object uses a virtual machine disk (VMDK). For example, VMDKs 111-118 are used by objects 101-108, respectively. Other implementations using different formats are also possible. A virtualization platform 130, which includes hypervisor functionality at one or more of computer nodes 121, 122, and 123, manages objects 101-108.

Figure 7:
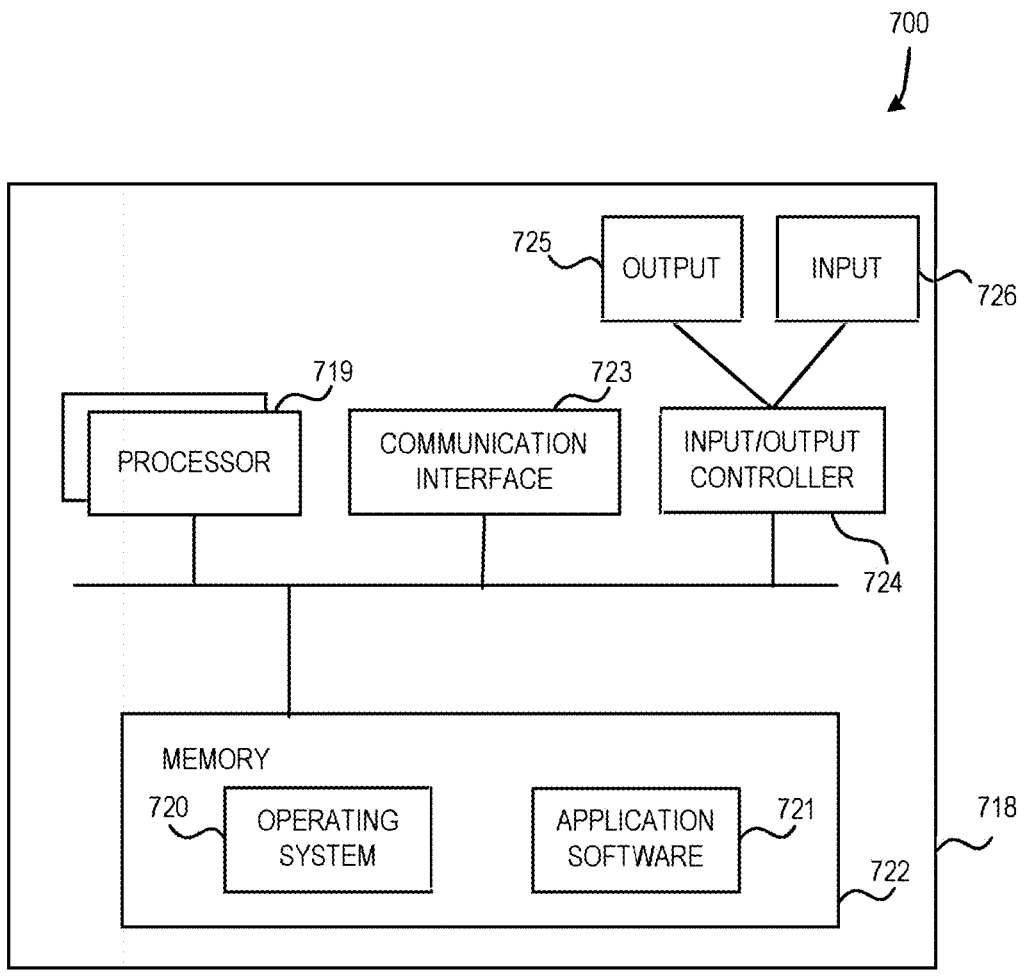
FIG. 7 illustrates an example computing apparatus as a functional block diagram.

In some examples, various components of architecture 100, for example compute nodes 121, 122, and 123, and storage nodes 141, 142, and 143 are implemented using one or more computing apparatuses 718 of FIG. 7.

Virtualization software provides software-defined storage (SDS) by pooling storage nodes across a cluster, creates a distributed, shared data store (e.g., a storage area network (SAN)). In some examples with distributed arrangements, servers are distinguished as compute nodes (e.g., compute nodes 121, 122, and 123) and storage nodes (e.g., storage nodes 141, 142, and 143). In some examples, storage nodes attach large quantities of storage devices (e.g., flash, solid state drives (SSDs) and non-volatile memory express (NVMe) and Persistent Memory (PMEM)) processing power are limited beyond the ability to handle input/output (I/O) traffic. Further, during data writes to storage devices, a phenomenon termed write amplification may occur, in which more data is written to the physical media than was sent for writing in the I/O. Write amplification is an inefficiency that produces unfavorable I/O delays, and it arises, for example, as a result of synchronization between redundant components to bring a stale component up to date, as described herein.

In some examples, storage nodes 141-143 each include multiple physical storage components, which include flash, solid state drives (SSDs), non-volatile memory express (NVMe), persistent memory (PMEM), and/or quad-level cell (QLC) storage solutions. For example, storage node 141 has storage 151, 152, 153, and 154; storage node 142 has storage 155 and 156; and storage node 143 has storage 157 and 158. In other examples, a single storage node includes a different number of physical storage components without departing from the description. In the described examples, storage nodes 141-143 are treated as a SAN with a single global object, enabling any of objects 101-108 to write to and read from any of storage 151-158 using a virtual SAN component 132. Virtual SAN component 132 executes in compute nodes 121-123.

In some examples, thin provisioning is used and storage nodes 141-143 do not require significantly more processing power than is needed for handling I/O traffic. This arrangement is less expensive than many alternative hyperconverged environments in which all of storage nodes 141-143 have the same or similar processing capability as compute node 121. Compute nodes 121-123 can operate with a wide range of storage options.

In some examples, compute nodes 121-123 each include a manifestation of virtualization platform 130 and virtual SAN component 132. Virtualization platform 130 manages the generating, operations, and clean-up of objects 101 and 102, including the moving of object 101 from compute node 121 to another compute node, to become a moved object. For instance, in an example, virtual SAN component 132 permits objects 101 and 102 to write incoming data from object 101 and incoming data from object 102 to storage nodes 141, 142, and/or 143, in part, by virtualizing the physical storage components of the storage nodes. Further, in some examples, the compute nodes 121, 122, and 123 include and make use of local storage nodes 161, 162, and 163, respectively, for storing some data used during the operation of the system 100 without departing from the description.

Figure 2:
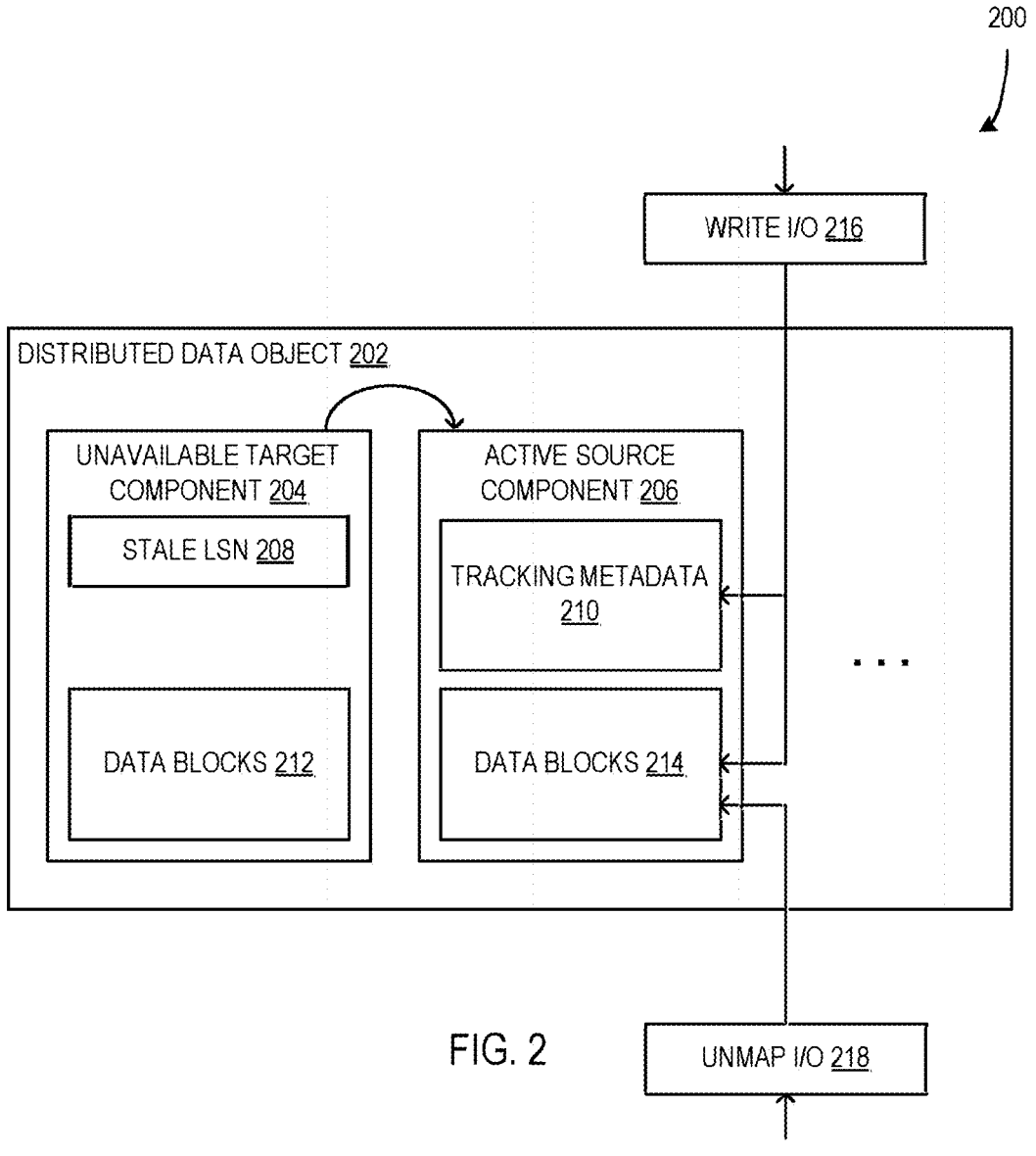
FIG. 2 is a block diagram illustrating a system configured for managing mirrored data components of a distributed data object when some data components are unavailable or stale.

FIG. 2 is a block diagram illustrating a system 200 configured for managing redundant data components (e.g., target component 204 and redundant source 206) of a distributed data object 202 when some data components are unavailable or stale. In some examples, the system 200 of FIG. 2 is implemented on a component or components of a system architecture such as system architecture 100 of FIG. 1. In some examples, the distributed data object 202 is part of a virtual storage network component or virtual SAN component 132 of FIG. 1 as described above.

In some examples, the system 200 of FIG. 2 includes the distributed data object 202 when the target component 204 is unavailable and the redundant source component 206 is active. The distributed data object 202 is configured to store data across a plurality of data components (data structures configured to store at least a portion of the total data associated with the distributed data object 202), such as the target component 204 and the source component 206. In some examples, the distributed data object 202 stores data redundantly across multiple components. For example, multiple copies of a set of data are stored on each of the target component 204 and the source component 206, such that the data is preserved if one or some of the components fail. The distributed data object 202 is configured to provide enhanced reliability and availability of the stored data through the redundant storage of data on the multiple components, enabling the data to be accessed despite failure or unavailability of individual components. Further, in some examples, the distributed data object 202 includes more and/or different data components similar to the illustrated target component 204 and source component 206 that are configured to mirror stored data in an array of data components (e.g., a redundant array of independent disks (RAID)). For instance, the distributed data object 202 may be configured to include four or greater redundant components to enhance the data durability and security of the distributed data object 202.

While the target component 204 is labeled differently from source component 206, in other examples, the target component 204 is effectively identical to the source component 206. Further, in some examples, the described functionality also applies to components of the distributed data object 202 other than the target component 204 and or associated source components.

As illustrated in FIG. 2, the target component 204 is unavailable. In some examples, the target component 204 has become unavailable due to failure of an associated host and/or network connection, the associated host being deactivated for maintenance, or another reason. When it is detected that the target component 204 is unavailable, the active source component 206, which is configured to store the same data as the target component 204, is configured to begin tracking changes to the data of the address space that the target component 204 and source component 206 share (e.g., the data blocks 212 and 214 respectively), such that the tracked changes can be used to bring the target component 204 up to date through a synchronization process if and/or when it becomes available again.

Changes to the data stored in the components 204 and 206 are in the form of I/O instructions, commands, or messages that write data values to and/or messages that deallocate or unmap data addresses within the shared address space of the components 204 and 206. Such I/O instructions may be known as "write I/O" (e.g., write I/O 216) or "unmap I/O" (e.g., unmap I/O 218), respectively. In some examples, each instance of write I/O 216 and unmap I/O 218 is assigned a log sequence number (LSN) by the system, which provides sequencing information that is used for a variety of operations within the distributed data object and/or associated components (e.g., synchronization of redundant components as described herein).

When the target component 204 becomes unavailable, it is associated with a stale LSN 208 which is indicative of the time instant at which the target component 204 became unavailable with respect to incoming I/O messages. The stale LSN 208 is the LSN of the I/O message that is the I/O message committed on the target component 204 before it became unavailable. While the stale LSN 208 is shown in the target component 204, in some examples, the stale LSN 208 of the target component 204 based on its unavailability is determined by other active redundant components, such as source component 206, rather than by the target component 204, which became unavailable suddenly due to a hardware failure or the like. In some examples, a stale LSN 208 of a component that has become unavailable is persisted or otherwise provided for use by other active redundant components in creating and maintaining tracking metadata (e.g., tracking metadata 210) and/or performing or otherwise participating in synchronization of associated stale components.

Based on the unavailability of the target component 204, the active source component 206 is configured to create and/or maintain tracking metadata 210 that can be used with the stale LSN 208 of the target component 204. The tracking metadata 210 is used to track changes made to the data blocks 214 while the target component 204 is unavailable. In some examples, the last write LSN at the block level (e.g., the LSN of the last I/O that updated a particular block) is stored in tracking metadata, which can later be used to synchronize the target component with a source component.

In other examples, other types of tracking metadata are stored in the tracking metadata 210 without departing from the description.

By tracking which data blocks of data blocks 214 are changed during the downtime of the target component 204, the target component 204 is brought up to date by synchronizing only those changed data blocks as indicated in the tracking metadata 210. As illustrated, the write I/O 218 represents one or more write I/O's that are provided to the distributed data object 202 and specifically targeted at the address space with which the target component 204 and the source component 206 are associated. The write I/O 216 is provided to the distributed data object 202 and causes changes to be made to one or more data blocks of the data blocks 214 of the active source component 206 and any other active redundant components associated with the address space. The tracking metadata 210 associated with the one or more data blocks that are changed is updated to reflect that those data blocks have been changed and/or that a particular write I/O 216 message caused the changes. In some examples, the tracking metadata 210 is specifically associated with the stale LSN 208 of the unavailable target component 204, such that the components are enabled to identify it as tracking metadata that indicates all the changes made to data blocks in the address space since the write I/O associated with the stale LSN 208 was committed to the target component 204 and the source component 206.

Further, in some examples, the distributed data object 202 receives unmap I/O 218 messages that are applied to the data components therein. Unmap I/O 218 messages indicate that portions of the address space with which the components of the object 202 are associated should be deallocated or unmapped. This means that the data stored in those portions of the address space will no longer be used and can safely be deleted or otherwise cleaned up by processes of the system. In some examples, an unmap I/O 218 being applied to an address range of the address space is the equivalent of deleting the data stored in that address range. Additionally, in some examples, the performance of unmap operations on components of the object 202 is done full stripe at the erasure coding level, meaning that such unmap operations are always performed on all active redundant components of the object 202.

While the unmap I/O 218 could be tracked in the tracking metadata 210 similar to how the write I/O 216 is tracked, it results in unnecessary use of computation and data storage resources of the system. Instead, the system 200 is configured to perform the unmap I/O 218 on the active source component 206 and any other active redundant components without tracking the changes made by the unmap I/O 218 in the tracking metadata 210. The synchronization of the target component 204 when it becomes available again will be performed as described below to account for both the tracked write I/O 216 and the unmap I/O 218 that is not tracked in the tracking metadata 210.

Figure 3:
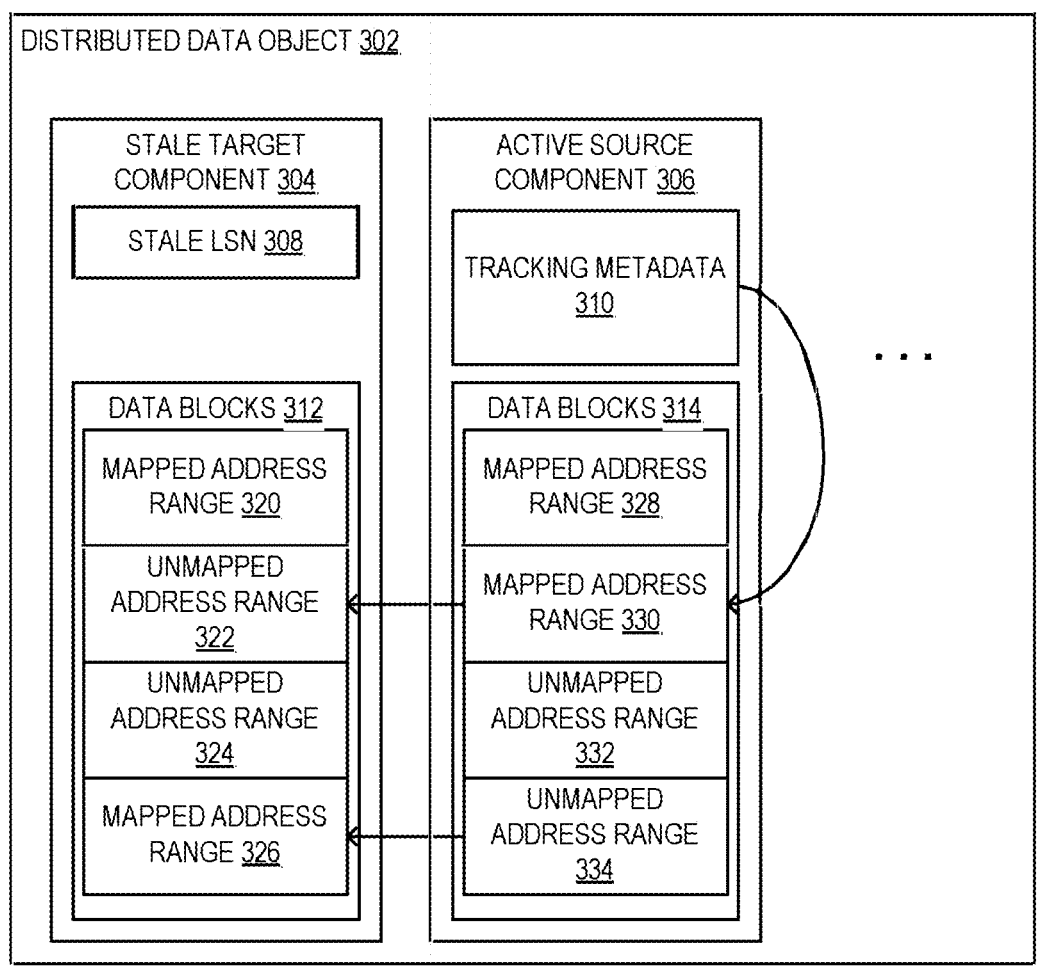
FIG. 3 is a block diagram illustrating a system configured for synchronizing a stale target component with an active source component of a distributed data object.

FIG. 3 is a block diagram illustrating a system 300 configured for synchronizing a stale target component 304 with an active source component 306 of a distributed data object 302. In some examples, the system 300 of FIG. 3 is the same system as system 200 of FIG. 2 and/or is implemented on a component or components of a system architecture such as system architecture 100 of FIG. 1. For example, the distributed data object 302 is part of a virtual storage network component or virtual SAN component 132 of FIG. 1 as described above.

In some examples, the system 300 of FIG. 3 includes the distributed data object 302 when the target component 304 is available and stale and the redundant source component 306 is active. The distributed data object 302 is configured to store data across a plurality of data components as described above with respect to distributed data object 202 of FIG. 2. Further, in some examples, the distributed data object 302 includes more and/or different data components similar to the illustrated target component 304 and source component 306 that are configured to mirror stored data in an array of data components. For instance, the distributed data object 302 may be configured to include four or greater redundant components to enhance the data durability and security of the distributed data object 302.

As illustrated in FIG. 3, the target component 304 has become available and stale. For example, the target component 304 can be accessed and operations can be performed on the target component 304, but it is out of sync with other components of the distributed data object 302, including the active source component 306. When it is detected that the target component 304 is available and stale, a manager of the distributed data object 302 causes the stale target component 304 to be synchronized with the active source component 306 as described herein. The synchronization process includes updating data blocks in the data blocks 312 of the target component 304 using data in the data blocks 314 of the source component 306.

In some examples, the write I/O operations that were performed on the source component 306 while the target component 304 was unavailable are performed on the target component 304 now that it is available. Further, in some examples, the write I/O operations to be performed on the target component 304 are determined based on the stale LSN 308 or other staleness indicator of the target component 304 and the tracking metadata 310 of the source component 306. In an example, the tracking metadata 310 includes LSNs of all write I/O operations that have been performed on the source component 306 after the stale LSN 308 (e.g., the LSNs of the determined operations are higher values than the stale LSN 308). The system 300 is then configured to cause the determined write I/O operations to be performed on the target component 304 during the synchronization process, such that the data blocks 312 are updated to include the data written by the determined write I/O operations. For instance, as illustrated, the mapped address range 330 includes data written to the data blocks 314 of the source component 306 during unavailability of the target component 304 as indicated by the tracking metadata 310. The corresponding unmapped address range 322 of the data blocks 312 of the target component 304 are synchronized with the mapped address range 330 by performing the associated write I/O operation(s).

Further, in some examples, address ranges that have been unmapped due to unmap I/O operations during the time that the target component 304 was unavailable are synchronized between the source component 306 and the target component 304. The system 300 is configured in such a way that the tracking metadata 310 does not include metadata associated with unmap I/O operations as described above with respect to FIG. 2. In some examples, instead of determining the unmap I/O operations that were performed on the data blocks 314 during the unavailability of the target component 304, the system 300 is configured to treat address ranges that have been unmapped due to unmap I/O operations and address ranges that are unmapped due to not being used as the same type of address ranges. Thus, the system 300 and/or a manager process of the distributed data object is configured to identify the unmapped address ranges of the source component 306 and compare those identified ranges to the corresponding address ranges of the stale target component 304. For unmapped address ranges of the source component 306 that correspond to mapped address ranges of the target component 304, the system 300 is configured to unmap those address ranges of the target component 304.

In some examples, the system 300 is configured to include an API that is configured to provide the address locations of all mapped address ranges and/or all unmapped address ranges within a component of the distributed data object 302, such as the source component 306. Those unmapped address locations are then compared to the corresponding address ranges of the target component 304 to determine which address ranges of the target component 304 to unmap. As illustrated, the unmapped address range 334 of the source component 306 is compared to the corresponding mapped address range 326 of the target component 304 and, upon determining that the address range 326 is mapped, the system 300 is configured to perform an unmap operation on the address range 326 to synchronize it with the unmapped address range 334.

It should be understood that, as illustrated, the mapped address range 320 and corresponding mapped address range 328 are already synchronized between the target component 304 and the source component 306, such that the described synchronization process does not affect these mapped address ranges 320 and 328. For example, write I/O operations have been performed on the target component 304 and source component 306 prior to the target component 304 becoming unavailable to write data to the mapped address ranges 320 and 328. Additionally, it should be understood that the unmapped address range 324 and corresponding unmapped address range 332 are already synchronized between the target component 304 and the source component 306, such that the described synchronization process does not affect these unmapped address ranges 324 and 332.

Further, it should be understood that, in other examples, more, fewer, or different address ranges are included in the target component 304 and source component 306 of the distributed data object 302 without departing from the description. Further, in some examples, the described synchronization process includes performing write I/O operations on different address ranges and/or performing unmap operations on different address ranges to synchronize the target component 304 with the source component 306 without departing from the description.

Figure 4:
FIG. 4 is a sequence diagram illustrating a process for managing a target component and a source component of a distributed data object.

FIG. 4 is a sequence diagram illustrating a process 400 for managing a target component 204 and a source component 206 of a distributed data object (e.g., distributed data object 202). In some examples, the process 400 is executed or otherwise performed in a system such as systems 100, 200, and 300 of FIGS. 1, 2, and 3, respectively.

The process 400 includes an object manager 401 associated with the distributed data object of the target component 204 and source component 206. The object manager 401 is configured to manage operations performed on the data components of the data object, include performing or otherwise managing the performance of write I/O operations and/or unmap I/O operations on the target component 204 and/or the source component 206. Further, in some examples, the object manager 401 is configured to control and/or manage the tracking metadata 210 of the source component 206 as described herein. It should be understood that, in other examples, the object manager 401 is configured to manage the operations of more and/or different data components of the distributed data object without departing from the description. Further, in some examples, the object manager includes a Distributed Object Manager (DOM)

and/or a Log-Structured Object Manager (LSOM) in a virtual SAN component such as virtual SAN 132 of FIG. 1.

At 402, the target component 204 becomes unavailable and a stale LSN (e.g., stale LSN 208) is established that is indicative of the last I/O operation that was performed on the target component 204 before it became unavailable. In some examples, the object manager 401 determines that the target component 204 is unavailable and establishes the stale LSN for later use in the process 400.

At 404, while the target component 204 is unavailable, a write I/O message or instruction is received by the object manager 401 and it performs the write I/O operation on the source component 206. As illustrated, the write I/O operation is not performed on the target component 204 because it is unavailable. At 406, metadata associated with the performed write I/O operation is recorded in tracking metadata 210 of the source component 206. In some examples, the object manager 401 is configured to cause the write I/O metadata to be recorded to the tracking metadata 210 through interactions with the source component 206 such as by using an API of the source component.

At 408, while the target component 204 is unavailable, the object manager 401 receives an unmap I/O message or instruction and it performs the unmap I/O operation on the source component 206. As illustrated, the unmap I/O operation is not performed on the target component 204 because it is unavailable. Further, no metadata associated with the unmap I/O operation is recorded in the tracking metadata 210 of the source component 206, thereby reducing the consumption of computation and/or data storage resources associated with recording and storing metadata.

At 410, the target component 204 becomes available and stale. In some examples, the object manager 401 determines when the target component 204 becomes available and determines that it is stale based on the established stale LSN. Based on the target component 204 being stale, the object manager 401 performs operations to synchronize the target component 204 with the source component 206 at 412. In some examples, the synchronization process includes the object manager 401 identifying the source component 206 as an available, up-to-date component that mirrors the data address range of the target component 204 from a set of potential source components.

At 414, during the synchronization process, the write I/O metadata in the tracking metadata 210 of the source component 206 is used to perform the associated write I/O operations on the target component 204. In some examples, this process is managed and/or performed by the object manager 401 through interactions with the source component 206. Additionally, or alternatively, in some examples, the use of the write I/O metadata includes identifying write I/O operations performed on the source component 206 after the stale LSN of the target component 204 based on stored LSNs of those write I/O operations in the tracking metadata 210. Further, in some examples, the tracking metadata 210 includes information about address ranges that are affected by the identified write I/O operations, such that synchronizing those address ranges from the source component 206 to corresponding address ranges in the target component 204 can be performed.

At 416, during the synchronization process, the unmapped address ranges of the source component 206 are determined. In some examples, the object manager 401 determines the unmapped address ranges of the source component 206 using an API of the component 206 as described herein.

At 418, the target component 204 is synchronized with the determined unmapped address ranges. In some examples, the object manager 401 identifies the address ranges of the target component 204 that correspond to the unmapped address ranges of the source component 206. When a corresponding address range of the target component 204 is found to be mapped, unmap operations are performed to unmap the address range of the target component 204, such that the address range is synchronized with the unmapped address range of the source component 206. In this way, unmap operations that are effectively equivalent to any unmap I/O operations performed on the source component 206 during the unavailability of the target component 204 are performed on the target component 204 without storing any tracking metadata about those operations on the source component 206.

FIG. 5 is a flowchart illustrating a method 500 for synchronizing a stale target component (e.g., stale target component 304) with a source component (e.g., source component 306) of a distributed data object (e.g., distributed data object 302). In some examples, the method 500 is performed in a system such as systems 100, 200, and/or 300 of FIGS. 1, 2, and 3, respectively.

At 502, a target component of the distributed data object that has become available and stale is detected. In some examples, the detection of the target component includes an object manager process or entity of the system detecting that the target component has become available after being unavailable for a period, as described above with respect to object manager 401 of FIG. 4. In some examples, components of the distributed data object are configured to send notifications to the object manager upon becoming available. In other examples, the target component becoming available and stale is detected in other ways without departing from the description.

At 504, a source component of the distributed data object that is up-to-date and that redundantly includes an address space of the detected target component is identified. In some examples, the object manager associated with the distributed data object is configured to identify the components of the object that are redundant with the target component and to select one or more of the identified redundant components as a source component. Alternatively, or additionally, the source component was previously identified when the unavailability of the target component was first detected, enabling the source component to track I/O operations performed during the unavailability of the target component as described herein.

At 506, a set of mapped address ranges and a set of unmapped address ranges of the source component are obtained. In some examples, the source component is configured to include an API that provides the set of mapped address ranges for the write I/Os that have happened after the stale LSN of the target component. Alternatively, in some examples, the source component is configured to include an API that provides the set of mapped address ranges and the set of unmapped address ranges at a current time. In other examples, the API is configured to provide the set of mapped address ranges and the set of unmapped address ranges are then derived from the set of mapped address ranges (e.g., any address range not included in the set of mapped address ranges is considered an unmapped address range).

At 508, a mapped address range of the target component is identified which corresponds to an unmapped address range of the set of unmapped address ranges of the source component. It should be understood that the identified mapped address range includes at least one address that is mapped and that the identified mapped address range includes unmapped portion(s) in some examples. Further, in some examples, each unmapped address range of the set of unmapped address ranges of the source component is compared to a corresponding address range of the target component, such that multiple mapped address ranges that correspond to unmapped address ranges of the source component are identified during the described synchronization process. It should be understood that, in some examples, the set of unmapped address ranges includes address ranges to which nothing has been written and address ranges to which data has been written and then later unmapped, such that each type of unmapped address range is treated in the same way.

At 510, the identified mapped address range of the target component is synchronized with the corresponding unmapped address range of the source component. In some examples, the synchronization of the identified mapped address range with the corresponding unmapped address range includes performing unmap I/O operations on the identified mapped address range such that it becomes unmapped.

Figure 6:
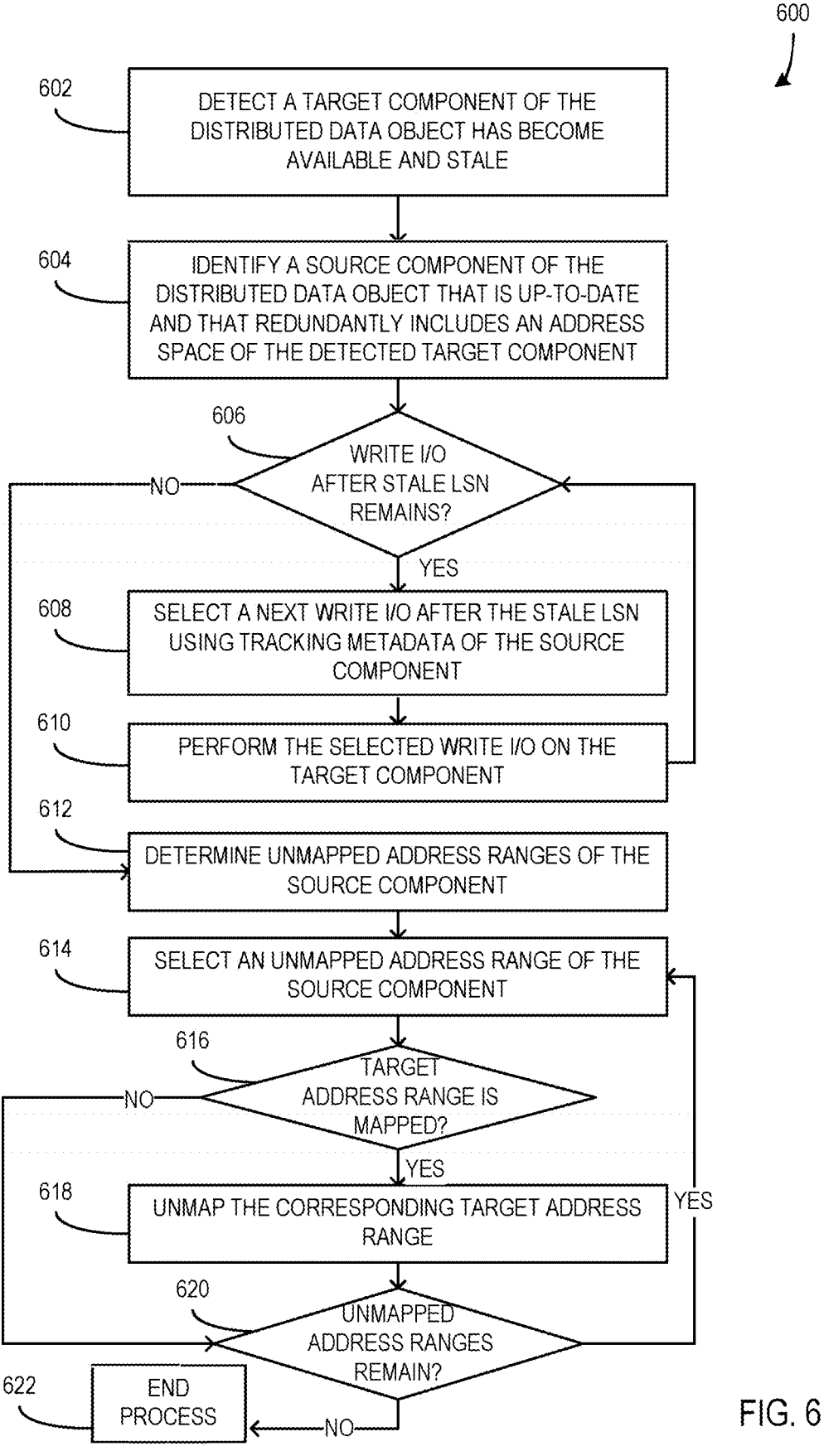
FIG. 6 is a flowchart illustrating a method for synchronizing a stale target component with a source component of a distributed data object, including handling write I/O.

FIG. 6 is a flowchart illustrating a method 600 for synchronizing a stale target component (e.g., stale target component 304) with a source component (e.g., source component 306) of a distributed data object (e.g., distributed data object 302), including handling write I/O. In some examples, the method 600 is performed in a system such as systems 100, 200, and/or 300 of FIGS. 1, 2, and 3, respectively.

At 602, a target component of the distributed data object that has become available and stale is detected. At 604, a source component of the distributed data object that is up-to-date and that redundantly includes an address space of the detected target component is identified. It should be understood that, in some examples, 602-604 are performed in the same way as 502-504 of FIG. 5, as described above.

At 606, if write I/O operations that occurred after the stale LSN of the target component (e.g., write I/O operations that occurred while the target component was unavailable) remains in the tracking metadata of the source component, the process proceeds to 608. Alternatively, if no write I/O operations that occurred after the stale LSN remains in the tracking metadata, the process proceeds to 612. In some examples, the stale LSN of the target component is determined when the target component becomes unavailable and is indicative of a time at which an I/O operation was last performed on the target component. In other examples, different indicators of the stale time instant of the target component are used without departing from the description. Write I/O operations performed on the source component after the stale LSN are tracked via the tracking metadata of the source component as described herein. Further, in some examples, unmap I/O operations performed on the source component after the stale LSN are not tracked via the tracking metadata of the source component to reduce the consumption of storage and/or computation resources associated with such tracking.

At 608, a next write I/O operation is selected from the set of remaining write I/O operations that occurred after the stale LSN of the target component using the tracking metadata of the source component and, at 610, the selected write I/O operation is performed on the target component. The process returns to 606.

At 612, unmapped address ranges of the source component are determined. In some examples, the determination of the unmapped address ranges of the source component is done using an API of the source component as described above at least with respect to 506 of FIG. 5.

At 614, an unmapped address range of the source component is selected from the determined set of unmapped address ranges. At 616, if the corresponding address range of the target component is mapped, the process proceeds to 618. Alternatively, if the corresponding address range of the target component is unmapped, the process proceeds to 620.

At 618, the corresponding address range of the target component is unmapped to synchronize it with the selected unmapped address range of the source component.

At 620, if unmapped address ranges of the source component remain, the process returns to 614. Alternatively, if there are no remaining unmapped address ranges of the source component, the process proceeds to 622, where it ends.

Exemplary Operating Environment

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, synchronizing stale target components with source components of distributed data objects as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: detect a target component of a distributed data object has become available and stale; identify a source component of the distributed data object that is up-to-date and that redundantly includes an address space of the detected target component; obtain a set of mapped address ranges and a set of unmapped address ranges in an address space of the identified source component; identify a mapped address range in the address space of the target component that corresponds to an unmapped address range in the address space of the source component using the determined set of unmapped address ranges; and synchronize the identified mapped address range in the address space of the target component with the corresponding unmapped address range in the address space of the source component.

An example computerized method comprises: detecting a target component of a distributed data object has become available and stale; identifying a source component of the distributed data object that is up-to-date and that redundantly includes an address space of the detected target component; obtaining a set of mapped address ranges and a set of unmapped address ranges in an address space of the identified source component; identifying a mapped address range in the address space of the target component that corresponds to an unmapped address range in the address space of the source component using the determined set of unmapped address ranges; and synchronizing the identified mapped address range in the address space of the target component with the corresponding unmapped address range in the address space of the source component.

One or more computer storage media have computer-executable instructions that, upon execution by a processor, cause the processor to at least: detect a target component of a distributed data object has become available and stale; identify a source component of the distributed data object that is up-to-date and that redundantly includes an address space of the detected target component; obtain a set of mapped address ranges and a set of unmapped address ranges in an address space of the identified source component; identify a mapped address range in the address space of the target component that corresponds to an unmapped address range in the address space of the source component using the determined set of unmapped address ranges; and synchronize the identified mapped address range in the address space of the target component with the corresponding unmapped address range in the address space of the source component.

Alternatively, or in addition to the other examples described herein, examples include any combination of the following:

further comprising: determining a stale time instant of the detected target component that indicates a time at which an I/O operation was last performed on the target component; identifying a write I/O operation that was performed on the source component after the stale time instant; and performing the identified write I/O operation on the target component.

wherein the stale time instant is tracked using a stale log sequence number (LSN), wherein each operation performed on the distributed data object is associated with an LSN that increments from an LSN of a previously performed operation.

wherein obtaining the set of mapped address ranges and the set of unmapped address ranges in the address space of the identified source component is performed using an application program interface (API) of the source component with the stale LSN as input.

further comprising: detecting that the target component is unavailable; receiving a write I/O operation to be performed on the distributed data object, including the target component and the source component; performing the write I/O operation on the source component; recording write I/O metadata of the performed write I/O operation in tracking metadata of the source component; receiving an unmap I/O operation to be performed on the distributed data object, including the target component and the source component; and performing the unmap I/O operation on the source component, wherein metadata of the performed unmap I/O operation is not recorded in the tracking metadata of the source component.

wherein performing the unmap I/O operation on the source component includes performing the unmap I/O operation as a full stripe erasure on the source component and at least one other available component of the distributed data object.

wherein the determined set of unmapped address ranges include a first address range in which nothing has been written and a second address range that has been unmapped after data has been written to the second address range.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for detecting a target component of a distributed data object has become available and stale; exemplary means for identifying a source component of the distributed data object that is up-to-date and that redundantly includes an address space of the detected target component; exemplary means for obtaining a set of mapped address ranges and a set of unmapped address ranges in an address space of the identified source component; exemplary means for identifying a mapped address range in the address space of the target component that corresponds to an unmapped address range in the address space of the source component using the determined set of unmapped address ranges; and exemplary means for synchronizing the identified mapped address range in the address space of the target component with the corresponding unmapped address range in the address space of the source component.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

The invention claimed is:

1. A system comprising:
a processor;
a non-transitory computer-readable medium storing instructions executable by the processor to perform operations comprising;
detecting that a target component of a distributed data object has become available and stale; and
synchronizing, without using tracking metadata, an identified mapped address range in an address space of the target component with a corresponding unmapped address range in an address space of a source component by identifying unmapped address ranges from a current state of the address space of the source component, the identified unmapped address ranges including address ranges unmapped due to unmap I/O operations and address ranges that have not been written to.

2. The system of claim 1, wherein the operations further comprise:
determining a stale time instant of the detected target component that indicates a time at which an I/O operation was last performed on the target component;
identifying a write I/O operation that was performed on the source component after the stale time instant; and
performing the identified write I/O operation on the target component.

3. The system of claim 2, wherein the stale time instant is tracked using a stale log sequence number (LSN), wherein each operation performed on the distributed data object is associated with an LSN that increments from an LSN of a previously performed operation.

4. The system of claim 3, wherein the operations further comprise:
obtaining, using an application program interface (API) of the source component, a set of mapped address ranges and a set of unmapped address ranges in the address space of the source component, using the stale LSN as input.

5. The system of claim 4, wherein the set of unmapped address ranges include a first address range in which nothing has been written and a second address range that has been unmapped after data has been written to the second address range.

6. The system of claim 1, wherein the operations further comprise:
detecting that the target component is unavailable;
receiving a write I/O operation to be performed on the distributed data object, including the target component and the source component;
performing the write I/O operation on the source component;
recording write I/O metadata of the performed write I/O operation in tracking metadata of the source component;
receiving an unmap I/O operation to be performed on the distributed data object, including the target component and the source component; and
performing the unmap I/O operation on the source component, wherein metadata of the performed unmap I/O operation is not recorded in the tracking metadata of the source component.

7. The system of claim 6, wherein performing the unmap I/O operation on the source component includes performing the unmap I/O operation as a full stripe erasure on the source component and at least one other available component of the distributed data object.

8. A computerized method comprising:
detecting that a target component of a distributed data object has become available and stale; and
synchronizing, without using tracking metadata, an identified mapped address range in an address space of the target component with a corresponding unmapped address range in an address space of a source component by identifying unmapped address ranges from a current state of the address space of the source component, the identified unmapped address ranges including address ranges unmapped due to unmap I/O operations and address ranges that have not been written to.

9. The computerized method of claim 8, further comprising:
determining a stale time instant of the detected target component that indicates a time at which an I/O operation was last performed on the target component;
identifying a write I/O operation that was performed on the source component after the stale time instant; and
performing the identified write I/O operation on the target component.

10. The computerized method of claim 9, wherein the stale time instant is tracked using a stale log sequence number (LSN), wherein each operation performed on the distributed data object is associated with an LSN that increments from an LSN of a previously performed operation.

11. The computerized method of claim 10, further comprising:
obtaining, using an application program interface (API) of the source component, a set of mapped address ranges and a set of unmapped address ranges in the address space of the source component, using the stale LSN as input.

12. The method of claim 11, wherein the set of unmapped address ranges include a first address range in which nothing has been written and a second address range that has been unmapped after data has been written to the second address range.

13. The computerized method of claim 8, further comprising:
detecting that the target component is unavailable;
receiving a write I/O operation to be performed on the distributed data object, including the target component and the source component;
performing the write I/O operation on the source component;
recording write I/O metadata of the performed write I/O operation in tracking metadata of the source component;
receiving an unmap I/O operation to be performed on the distributed data object, including the target component and the source component; and
performing the unmap I/O operation on the source component, wherein metadata of the performed unmap I/O operation is not recorded in the tracking metadata of the source component.

14. The computerized method of claim 13, wherein performing the unmap I/O operation on the source component includes performing the unmap I/O operation as a full stripe erasure on the source component and at least one other available component of the distributed data object.

15. A non-transitory computer readable storage medium storing instructions executable by one or more processors to perform operations comprising:

detecting that a target component of a distributed data object has become available and stale; and synchronizing, without using tracking metadata, an identified mapped address range in an address space of the target component with a corresponding unmapped address range in an address space of a source component by identifying unmapped address ranges from a current state of the address space of the source component, the identified unmapped address ranges including address ranges unmapped due to unmap I/O operations and address ranges that have not been written to.

16. The non-transitory computer readable storage medium of claim 15, where the operations further comprise:

determining a stale time instant of the detected target component that indicates a time at which an I/O operation was last performed on the target component;

identifying a write I/O operation that was performed on the source component after the stale time instant; and performing the identified write I/O operation on the target component.

17. The non-transitory computer readable storage medium of claim 16, wherein the stale time instant is tracked using a stale log sequence number (LSN), wherein each operation performed on the distributed data object is associated with an LSN that increments from an LSN of a previously performed operation.

18. The non-transitory computer readable storage medium of claim 17, wherein the operations further comprise:

obtaining, using an application program interface (API) of the source component, a set of mapped address ranges and a set of unmapped address ranges in the address space of the source component, using the stale LSN as input.

19. The non-transitory computer readable storage medium of claim 15, wherein the operations further comprise:

detecting that the target component is unavailable;

receiving a write I/O operation to be performed on the distributed data object, including the target component and the source component;

performing the write I/O operation on the source component;

recording write I/O metadata of the performed write I/O operation in tracking metadata of the source component;

receiving an unmap I/O operation to be performed on the distributed data object, including the target component and the source component; and performing the unmap I/O operation on the source component, wherein metadata of the performed unmap I/O operation is not recorded in the tracking metadata of the source component.

20. The non-transitory computer readable storage medium of claim 19, wherein performing the unmap I/O operation on the source component includes performing the unmap I/O operation as a full stripe erasure on the source component and at least one other available component of the distributed data object.

* * * * *